March 30, 1926.
P. SIMONS
CULTIVATOR
Filed April 10, 1925
1,578,771
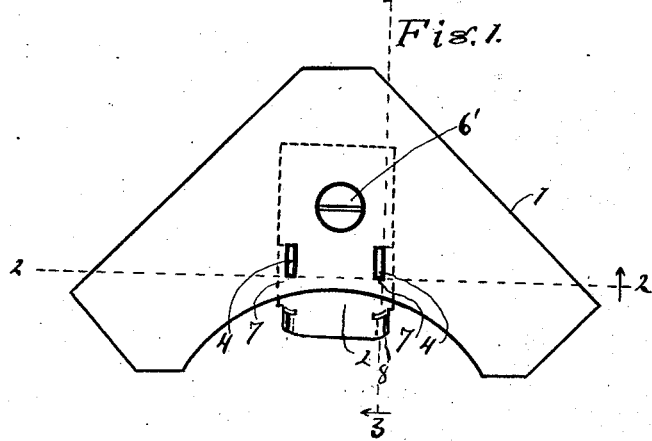
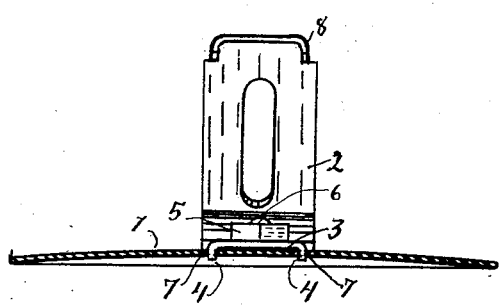
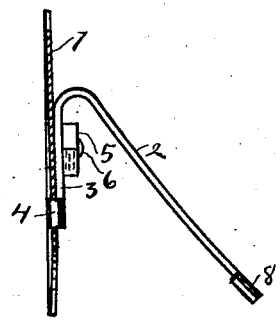
INVENTOR.
Philip Simons,
BY Ithiel J. Cilley
ATTORNEY.

Patented Mar. 30, 1926.

1,578,771

UNITED STATES PATENT OFFICE.

PHILIP SIMONS, OF PEWAMO, MICHIGAN.

CULTIVATOR.

Application filed April 10, 1925. Serial No. 22,067.

*To all whom it may concern:*

Be it known that I, PHILIP SIMONS, a citizen of the United States, residing at Pewamo, in the county of Ionia and State of Michigan, have invented certain new and useful Improvements in Cultivators, of which the following is a specification.

My invention relates to improvements in cultivators, and its objects are: first, to provide a means whereby a worn out, or broken cultivator sweep may be readily removed and as readily replaced; second, to provide a means whereby an easily removed and replaced cultivator sweep may be made absolutely firm in its position upon the supporting arm; and, third, to provide a means whereby the sweep may be securely attached to its supporting arm with a single securing element.

I attain these objects by the construction of parts shown in the accompanying drawing, in which Fig. 1 is a bottom plan of a cultivator sweep showing my manner of securing it to its supporting arm. Fig. 2 is a sectional elevation of the same on the line 2—2 of Fig. 1, and Fig. 3 is a sectional elevation of the same on the line 3—3 of Fig. 1.

Similar reference numerals indicate similar parts throughout the several views.

In the usual construction of these sweeps, the sweep 1 is solidly riveted to the arm 2 with two rivets, and the curvature or bend in the arm next to the sweep renders it very inconvenient to remove and replace a broken, or worn out sweep, and necessitates the purchase of both elements to make a change in, or to replace a disabled sweep, and to overcome this I have arranged to bolt the sweep to the arm, and for this purpose I provide a bolt 6 having a countersunk head arranged to enter the countersink in the lower surface of the sweep, as at 6' in Fig. 1, the bolt passing through both the sweep and the wing 3 on the arm 2, and securely clamped in place by the use of the nut 5 screwed firmly upon the bolt 6.

To prevent the possibility of the sweep 1 being swung sidewise out of place on the arm 2 I make two slots, as shown at 7, through the sweep, and then form two offset lugs, as shown at 4, at the end of the wing 3 designed to pass through said slots and, with the bolt 6, hold the sweep 1 as securely in place upon the arm as would be possible with any number of rivets, and at the same time, render the sweep easy of removal and replacement.

It will be readily understood that the same result may be attained by the use of one such lug, or of more than two, as, for instance, a lug might be formed at the extreme end of the wing 3 and passed through a single slot in the sweep, but I prefer the use of the two as it requires less material, less die expense, and makes a better appearance.

In the manufacture of the arms 2 I find it advantageous to form depending lugs, 8, at the upper ends of these arms to pass downwardly upon the sides of the cultivator brace to which these arms are secured, to prevent the arms from swinging upon the bolts with which they are secured, but as the manner of securing the arms 2 to the cultivator braces is common I do not deem it necessary to illustrate this feature, as the manner of securing the sweeps upon the arm is all I desire to secure at this time.

It is understood that in the common construction of this class of cultivator, a bolt is passed through the slot, 9, in the arm 2 and through a corresponding hole in the cultivator brace for securing the arm 2 to the brace, hence illustration is unnecessary.

Having thus fully described my invention, what I claim as new in the art, is:

In cultivator sweep construction, a flat cultivator sweep having a counter sunk hole centrally located therethrough, an arm mounted upon the upper surface of the sweep and having an integral wing thereon, said wing having a hole therethrough corresponding with the hole through the sweep, a bolt passed through said holes and a nut screwed thereon firmly securing the sweep to the wing of the arm, the sweep having slots therethrough, and lugs cut and formed integral with the wing to pass through said slots and hold the sweep from sidewise or revoluble movement.

Signed at Pewamo, Michigan, April 7th, 1925.

PHILIP SIMONS.